3,228,884
METHOD FOR PRODUCING A CORROSION INHIBITED ANTIFREEZE COMPOSITION
Louis G. Daignault, Fred W. Moore, and Michael P. Antalek, Fishkill, N.Y., and Melvin E. Gilliland, Port Arthur, Tex., assignors to Texaco Inc., New York, N.Y., a corporation of Delaware
No Drawing. Filed June 28, 1961, Ser. No. 120,158
2 Claims. (Cl. 252—75)

This invention relates to novel corrosion and foam inhibited antifreeze compositions and to aqueous solutions thereof. The invention also concerns a method of producing the novel antifreeze compositions and their aqueous solutions. In addition, the invention covers a method for preventing corrosion of metals which come in contact with such compositions.

It is well known that uninhibited aqueous antifreeze solutions cause serious corrosion of metals in heat exchange systems during service. These uninhibited antifreezes promote corrosion of brass, copper, solder, steel and cast iron in heat exchange apparatus such as the cooling systems of internal combustion engines. Further with the recent development of engines constructed of aluminum many of the past corrosion inhibited antifreeze compositions are not suitable therefor in that they accelerate the corrosion of aluminum to an unacceptable degree.

In the past a large number of corrosion inhibitors and combinations thereof have been employed in antifreeze compositions. The antifreezes having the inhibitors dissolved only in the freezing point depressant and without any separate oil layer are known as single phase antifreezes, and those which have at least some of their inhibitors dissolved in a separate oil phase, not soluble in the freezing depressant, are known as the two-phase antifreezes.

Although many of the prior inhibited antifreezes are generally satisfactory they are often deficient in one or more aspects. For example, as previously mentioned the cooling systems of internal combustion engines are constituted of many metals such as brass, copper, solder, steel, cast iron and aluminum. Many of the prior art antifreezes although protecting against the corrosive deterioration of some of the metal found in a cooling system, do this at the expense of the protection of other of the metals making up the cooling system such as aluminum. In addition, many of the antifreezes create further problems in a heat exchange system such as deteriorating rubber radiator hoses, foaming and creeping (leaking) through the microscopic cracks in the radiator hose.

An object of this invention is to provide new antifreeze compositions and aqueous solutions thereof which afford superior corrosion protection to metals normally found in heat exchange apparatus. Another object is to provide an antifreeze which does not significantly deteriorate aluminum type engines. Still another object is to provide an antifreeze which is non-foaming, scum resistant, resistant to creep and does not deteriorate rubber hosing. Still another object is to provide a method of forming the novel antifreeze of the invention. Further objects of the invention will become apparent from the remaining disclosure.

In accordance with this invention and the objects thereof, we have discovered antifreeze compositions and aqueous solutions thereof comprising a water soluble liquid alcohol freezing point depressant, and a corrosion inhibiting agent comprising alkali metal tetraborate, alkaline earth metal tetraborate, alkali metal metaborate, alkaline earth metal metaborate, alkali metal mercaptobenzothiazole and an alkali metal arsenite.

Another embodiment of the invention is the foregoing novel antifreeze in combination with a separate oil phase, said oil phase comprising a light lubricating oil solution of a carbon dioxide ($CO_2$) neutralized basic alkaline earth metal sulfonate of a molecular weight between about 900 and 1500.

The novel antifreezes of the invention have been found to be outstanding in retarding the corrosion of metals normally found in heat exchange systems. This overall corrosion protection is believed to be accomplished by the particular combination of the antifreeze ingredients which interact with one another to afford such protection even though some of the ingredients therein in themselves are corrosive to metals of heat exchange systems. For example, it appears that borax (sodium tetraborate decahydrate) substantially accelerates the corrosion of aluminum and sodium metaborate accelerates the corrosion of solder. Yet, these two ingredients when in the particular combinations contemplated by the invention act to counteract the deleterious effect of each while acting in concert to retard the corrosion of the other metals normally found in the cooling system.

In addition, we have discovered that our antifreeze compositions are resistant to foaming even though many of the ingredients therein such as the alkali metal tetraborates are known foam producing agents.

Still further we have found that when an oil phase containing a $CO_2$ neutralized basic alkaline earth metal sulfonate is used in combination with the inhibited alcoholic freezing point depressant contemplated herein, the overall inhibiting action of the antifreeze is increased substantially.

In greater detail the freezing point depressants of our novel compositions are any of the water miscible liquid alcohols such as the monohydroxy lower alcohols and the liquid polyhydroxy alcohols such as the alkylene and dialkylene glycols. Specific examples of the alcohols contemplated herein are methanol, ethanol, propanol, isopropanol, butanol, ethylene glycol, diethylene glycol, propylene glycols, butylene glycols and mixtures thereof. A preferred alcohol is ethylene glycol and when sold commercially often contains a small amount, up to about 10% by weight, of diethylene glycol. The term "ethylene glycol" as used herein is to read either on the pure or commercial form. This is also true for the other freezing point depressant alcohols contemplated. The freezing point depressant advantageously comprises between about 90 and 99 wt. percent, preferably between 95 and 96 wt. percent, of the non-aqueous antifreeze, the remainder of the non-aqueous antifreeze being substantially the corrosion inhibiting agent.

The corrosion inhibiting agent advantageously is present in the antifreeze compositions of the invention in an amount between about 1 and 9 wt. percent, preferably between 2 and 4.5 wt. percent, based on the weight of the water-soluble alcohol and comprises between about 24 and 27 wt. percent alkali metal tetraborate, between about 36 and 45 wt. percent alkali metal metaborate, between about 4 and 5 wt. percent alkaline earth metal tetraborate, between about 6 and 10 wt. percent alkaline earth metal metaborate, between about 3 and 4 wt. percent alkali metal mercaptobenzothiazole and between about 13 and 22 wt. percent alkali metal arsenite. A preferred inhibitor combination is sodium tetraborate decahydrate (borax), sodium metaborate, calcium tetraborate, calcium metaborate, sodium mercaptobenzothiazole and sodium arsenite. We include within the definition of the meta- and tetra-borates the hydrous as well as the anhydrous forms thereof.

One embodiment of our invention as heretofore stated, contemplates the use of an oil phase in combination with the inhibited freezing point depressant. The added oil phase advantageously constitutes between about 0.5 to 2.5 vol. percent, preferably between 0.75 and 1.25 vol. percent, based on the volume of the freezing point depressant. The oil phase itself desirably comprises between about 0.5 and 5 wt. percent of an oil soluble $CO_2$ neutralized alkaline earth metal hydrocarbon sulfonate having a molecular weight of between about 900 and 1500 and between about 95 and 99.5 wt. percent of a light lubricating oil.

By the term "$CO_2$ neutralized basic alkaline earth metal hydrocarbon sulfonate" it is intended to include approximately an equimole mixture of alkaline earth metal hydrocarbon sulfonate and alkaline earth metal carbonate, said mixture derived from the $CO_2$ treatment of the product resulting from the reaction of a hydrocarbon sulfonic acid with approximately twice the stoichiometric amount of alkaline earth metal oxide or hydroxide. A specific example of a $CO_2$ neutralized sulfonate is a $CO_2$ neutralized basic barium alkybenzene sulfonate having a molecular weight of between about 1100 and 1300, and a barium content of between about 21 and 25 wt. percent.

A specific example of the light lubricating oils contemplated in the oil phase are the naphthenic lubricating oils having a Saybolt Universal viscosity between about 50 and 100 at 100° F. and an API gravity between about 20 and 28°.

A preferred oil phase consists of 2.5 wt. percent $CO_2$ neutralized basic barium dialkylbenzene sulfonate having a molecular weight of about 1232 and a barium content of about 22.2 wt. percent and 97.5 wt. percent of a naphthenic lubricating oil having a gravity between 22 and 25° API, and a Saybolt Universal viscosity at 100° F. of between 70 and 75.

Water may be combined with the antifreezes of this invention in any and all proportions to form the aqueous antifreeze solutions thereof. When the aqueous solutions of the novel antifreezes are to be used in cooling systems the water miscible freezing point depressant should generally constitute at least about 10 vol. percent, preferably between about 20 and 60 vol. percent of the aqueous antifreeze solution. The corresponding water content therefore constitutes less than about 90 vol. percent, preferably between about 40 and 80 vol. percent of the aqueous antifreeze solution.

In the preparation of our novel antifreezes on a commercial scale it is desirable to first make up a concentrate of the antifreeze for storage and/or transportation and then prior to packaging antifreeze for retail distribution, diluting the antifreeze concentrate with additional freezing point depressant to bring the ingredient contents to the desired levels. We have found that a particular method is required in formulating the antifreeze compositions contemplated herein in this manner. More particularly, it was discovered that the following order of addition of ingredients under the prescribed conditions are necessary in order to prevent undesirable gelling and the formation of insoluble alkaline earth arsenites in the final antifreeze composition.

To between about ⅛ and 1/12 of the total amount of freezing point depressant to be used, there is added at a temperature between 195 and 205° F. with agitation alkali metal tetraborate, boric acid and an alkaline earth metal oxide and the agitation is continued and temperature maintained until solutioning of substantially all the ingredients occurs. The boric acid and alkaline earth metal oxide react to form a mixture of alkaline earth metal metaborate and alkaline earth metal tetraborate. At this point the reaction mixture is preferably filtered to remove any precipitate and the temperature reduced, e.g., to between about 140 and 180° F. To the thus cooled reaction mixture, alkali metal mercaptobenzothiazole is added either as a solid or aqueous solution together with sodium hydroxide either as a solid or aqueous solution. Additional freezing point depressant may also be introduced at this point. The resultant mixture is stirred until solutioning of the additional ingredients occurs. The reduction of temperature is required to prevent the decomposition of the alkali metal mercaptobenzothiazole to dibenzyl disulfide. Dibenzyl disulfide is an insoluble precipitate and thereby eliminates the mercaptobenzothiazole as an effective inhibitor. It is to be noted that at this point the alkali metal hydroxide addition converts part of the alkali metal tetraborate into alkali metal metaborate.

The resultant solution is cooled to ambient temperature, e.g., about 98° F., and the remaining freezing point depressant is added together with the alkali metal arsenite either as a solid or as an aqueous solution, and agitation is continued until solutioning is accomplished. Following this step the sulfonate oil phase, if to be employed, is added to the finished single phase antifreeze solution at ambient temperature to form the two phase antifreeze. The resultant single and two phase antifreezes are now ready for addition to water for use in heat exchange systems.

In the foregoing method, if the alkali metal arsenite is added prior to the addition of the remaining alcoholic freezing point depressant, an undesirable gel is formed together with an alkaline earth arsenite which is insoluble in the liquid freezing point depressant solution both of which are difficult to redissolve.

The following examples serve to illustrate our invention but are not to be interpreted as limitation thereof:

EXAMPLE I

This example illustrates the method of preparation of the novel antifreeze compositions.

To 17,539 lbs. of ethylene glycol maintained in agitation at a temperature of 200° F., there were added with stirring 3,780 lbs. borax, 567 lbs. boric acid, 227 lbs. lime. The resultant mixture was filtered and the filtrate was cooled to 150° F. and 760 lbs. of a filtered aqueous ethylene glycol solution of sodium mercaptobenzothiazole (water: ethylene glycol: mercaptobenzothiazole weight ratio of (2:1:1)) and 945 lbs. of a 50 wt. percent aqueous solution of sodium hydroxide and 189 lbs. of water were mixed into the filtrate to form a concentrate suitable for bulk shipment.

Subsequently to 23,628 lbs. of the concentrate 162,994 lbs. of ethylene glycol and 1,890 lbs. of a 50 wt. percent aqueous arsenite solution and 488 lbs. of water were simultaneously added with stirring at ambient temperature. The resultant antifreeze was of the following composition:

| Composition: | Percent by wt. |
|---|---|
| Ethylene glycol | 95.50 |
| Borax | 0.80 |
| Sodium metaborate | 1.25 |
| Calcium tetraborate | 0.11 |
| Calcium metaborate | 0.25 |
| Sodium mercaptobenzothiazole | 0.10 |
| Sodium arsenite | 0.50 |
| Water | 1.49 |

The water in the above composition is not an essential ingredient thereof and is derived from the use of aqueous solutions, water of reaction and from the addition of water to facilitate the formation of the composition.

EXAMPLE II

The procedure of Example I was repeated except the 50 wt. percent aqueous sodium aresnite solution was introduced into the reaction mixture prior to the final addition step of ethylene glycol. As a result, the reaction mixture undesirably formed a gel and a white precipitate. The white precipitate was identified as calcium arsenite.

EXAMPLE III

This example illustrates the preparation of an embodiment of the invention, namely, the two phase antifreeze.

To 189,000 lbs. of the single phase antifreeze prepared by the method of Example I, there was added 1,537 lbs. of an oil solution consisting of 2.5 wt. percent of $CO_2$ neutralized basic barium dialkylbenzene sulfonate of a molecular weight of 1232 and a barium content of 22.2 wt. percent and 97.5 wt. percent of a naphthenic lubricating oil of a gravity of 23° API and a Saybolt Universal viscosity at 100° F. of 73. The resultant mixture formed two separate layers, the bottom layer constituting 99 vol. percent of the antifreeze of Example I and the top layer, constituting 1 vol. percent of the sulfonate oil formulation described above.

EXAMPLE IV

This example illustrates the corrosion inhibiting effectiveness of the antifreeze compositions of this invention.

The corrosion test employed, and which is described directly below, simulates conditions under which corrosion of oxidizable metals is frequently encountered in automotive engine systems containing antifreeze coolants.

A clean, open-top, Pyrex glass cell is fitted with two air inlet tubes respectively connected to the bottom and the middle of the cell, both joining outside the cell to form a single inlet tube, and an air outlet tube connected to the upper side of the cell. One hundred fifty (150) milliliters of a 25% by volume antifreeze solution in water is charged to the cell. The water used to dilute the antifreeze has a 200 p.p.m. (by weight) chloride ion concentration. The air outlet tube is connected to a water cooled condenser and the joined inlet tubes are connected to a compressed air source. The open top of the cell is closed with a new rolled cork through which is passed a glass rod ending in a hook from which a bundle of test metal strip is suspended by the Nichrome wire. The test bundle comprises clean and weighed test metal strips of copper, brass, solder, cast iron, steel and cast aluminum having a known surface area. The test metal coupons are removably mounted on a brass bolt and spaced with stainless steel washers. The bolt is tightened with a brass nut to hold the test metal strips rigid. This arrangement galvanically couples the individual metal strips to one another. The surface area of these test metals are in approximately the same relative proportions to one another as they would be in a representative automotive cooling system. The ratio of test metal surface area to coolant is also approximately the same as in the automotive cooling system.

The glass rod is adjusted so that the test bundle is immersed in the test solution. The glass cell is then placed in an oil bath maintained at a temperature of 175° F. and air is bubbled into the test solution through the air inner tube at a rate of 50 milliliters per minute. The air was previously scrubbed free of any carbon dioxide by passing it through a 20 wt. percent aqueous solution of caustic. The cell is maintained in an oil bath for a period of 161 hours whereupon the test bundle is removed. Each test metal strip is freed of corrosion products by scrubbing with a household basic cleaner and a soft cloth and successively rinsed in distilled water and acetone. Each test metal strip is then dried and reweighed with the weight loss being calculated on the basis of milligrams lost per square decimeter of original surface area of the test metal strip (mg/sq. dm.).

The three antifreezes subjected to the above test were designated as Antifreeze A and Antifreeze B and Antifreeze C. Antifreeze A is an uninhibited aqeuous glycol solution and Antifreezes B and C are representatives of the novel antifreeze compositions of the invention and are respectively described in Examples I and III.

The test data and results are reported below in Table I:

*Table I*

| Description | Antifreeze A | Antifreeze B | Antifreeze C |
|---|---|---|---|
| Composition of Test Solution, vol. percent: | | | |
| Water Component (200 p.p.m. Cl-) | 75 | 75 | 75 |
| Antifreeze Component | 25 | 25 | 25 |
| Composition of Single Phase Antifreeze Component, wt. percent: | | | |
| Ethylene Glycol | 100 | 95.50 | 95.50 |
| Borax | | 0.80 | 0.80 |
| Sodium Metaborate | | 1.25 | 1.25 |
| Calcium Tetraborate | | 0.11 | 0.11 |
| Calcium Metaborate | | 0.25 | 0.25 |
| Sodium Mercaptobenzothiazole | | 0.10 | 0.10 |
| Sodium Arsenite | | 0.50 | 0.50 |
| Water | | 1.49 | 1.49 |
| Composition of Two Phase Antifreeze, vol. percent: | | | |
| Single Phase | | | 99 |
| Oil Phase | | | 1 |
| Corrosion Loss of Test Strips, mg./sq. dm.: | | | |
| Brass | 3 | 4 | 1 |
| Copper | 7 | 5 | +1 |
| Solder | 56 | 52 | 3 |
| Steel | 2,095 | 0 | +3 |
| Cast Iron | 2,210 | 9 | +26 |
| Cast Aluminum | 20 | 350 | +19 |

As can be seen from the above table our novel antifreezes substantially reduce the corrosion of brass, copper, solder, steel and cast iron while either reducing aluminum corrosion or maintaining it at a relatively low level.

EXAMPLE V

This example illustrates the desirable foam resistant properties of the novel antifreeze compositions and their superiority to analogous antifreezes as well as their superiority over uninhibited glycol formulation.

The foam test procedure employed consists of placing 250 cc. of a 25% or 40% by volume antifreeze in distilled water and 12.5 cc. of a foam producing agent in a clean 800 milliliter beaker and stirring the beaker contents with an electric mixer of the household variety operated at the speed of 1000 r.p.m. for a 100 second period while maintaining the test solution temperature at 160° F. At the instant the mixing is cut off foam height and foam collapsed time are measured. The foam collapsed time is the interval between the mixing cut off and the appearance of the first stable opening in the foam layer. The composition of the foam producing agent employed, designated as Agent X, is as follows:

AGENT X

Ingredients: Wt. percent
Sodium sulfonate oil mixture _____ 16.0
Gum rosin _____ 4.2
Naphthenic acid _____ 7.1
Sodium hydroxide (49 wt. percent in water) __ 2.0
Ethylene glycol monobutyl ether _____ 1.0
Water _____ 0.9
Lubricating oil (Saybolt Universal viscosity of 70 seconds at 100° F.) _____ 68.8

Four antifreeze compositions were subjected to the previously described foaming and modified foaming test. These antifreeze formulations are respectively designated as antifreezes D, E, F, G. Antifreeze D is an uninhibited ethylene glycol. Antifreeze E is a comparative inhibited antifreeze and Antifreezes F and G are representative of the novel compositions of this invention. The latter two antifreezes are respectively described by Examples I and III.

The data and results of the foaming test are reported below in Table II.

Table II

| Description | Antifreeze D | Antifreeze E | Antifreeze F | Antifreeze G |
| --- | --- | --- | --- | --- |
| Composition of Test Solution, vol. percent: | | | | |
| Water Component (distilled) | 75 | 75 | 60 | 60 |
| Antifreeze Component | 25 | 25 | 40 | 40 |
| Composition of Single Phase Antifreeze Component, wt. percent: | | | | |
| Ethylene Glycol | 100 | 97.5 | 95.50 | 95.50 |
| Borax | | 2.5 | 0.80 | 0.80 |
| Sodium Metaborate | | | 1.25 | 1.25 |
| Calcium Tetraborate | | | 0.11 | 0.11 |
| Calcium Metaborate | | | 0.25 | 0.25 |
| Sodium Mercaptobenzothiazole | | | 0.10 | 0.10 |
| Sodium Arsenite | | | 0.50 | 0.50 |
| Water | | | 1.49 | 1.49 |
| Composition Two Phase Antifreeze Component, vol. percent: | | | | |
| Single Phase Component | | | | 99 |
| Oil Phase | | | | 1 |
| Tests: | | | | |
| Foam Height, inches | 4+3/8 | 4+1/2 | 0 | 0 |
| Foam Collapse Time, sec | 600+ | 600+ | 0 | 0 |

From an inspection of the results reported in the above Table II, it is seen that the novel antifreeze compositions of the invention suppress foaming in the presence of a foam producing agent. In contrast, the uninhibited antifreeze and the comparative inhibited antifreeze composition do not have these reserve foam resisting properties.

EXAMPLE VI

This example illustrates the unpredictability of determining in advance the inhibiting characteristics of our corrosion inhibiting ingredient combination in an antifreeze formulation.

Four test antifreeze formulations were subjected to the corrosion test described in Example III. They are respectively designated as Antifreeze H, Antifreeze I, Antifreeze J and Antifreeze K.

Antifreeze H was uninhibited glycol. Antifreeze I contained only borax as inhibitor. Antifreeze J contained the inhibitor combination of sodium metaborate and sodium mercaptobenzothiazole and Antifreeze K contained the inhibitor combination of sodium metaborate, borax and sodium mercaptobenzothiazole. It is to be noted that all the inhibitors in Antifreezes I, J and K are found in the antifreeze composition of the invention.

The test data and results are reported below in Table III.

Table III

| Description | Antifreeze H | Antifreeze I | Antifreeze J | Antifreeze K |
| --- | --- | --- | --- | --- |
| Composition of Test Solution, vol. percent: | | | | |
| Water Component (200 p.p.m. Cl⁻) | 75 | 75 | 75 | 75 |
| Antifreeze Component | 25 | 25 | 25 | 25 |
| Composition of Antifreeze Component, wt. percent: | | | | |
| Ethylene Glycol | 100 | 97.3 | 97.1 | 97.2 |
| Borax | | 2.5 | | 1.2 |
| Sodium Metaborate | | | 2.7 | 1.4 |
| Sodium Mercaptobenzothiazole | | 0.2 | 0.2 | 0.2 |
| Corrosion Loss of Test Strips, mg./sq. dm.: | | | | |
| Brass | 3 | 4 | 2 | 3 |
| Copper | 7 | 6 | 3 | 5 |
| Solder | 56 | 43 | 109 | 51 |
| Steel | 2,095 | 18 | 1 | 67 |
| Cast Iron | 2,210 | 13 | +39 | 59 |
| Cast Aluminum | 20 | 323 | 11 | 246 |

As can be seen from the above table the inhibitor combination in Antifreeze I accelerates the corrosion of brass and aluminum while retarding the corrosion of copper, solder, steel and cast iron. Antifreeze J accelerates the corrosion of solder but retards the corrosion of the remaining metals. Antifreeze K accelerates the corrosion of aluminum and retards the corrosion of the remaining metals. As between the inhibited antifreezes the unpredictability of inhibitor combinations is seen in respect to steel. For example, Antifreezes I and J give substantially lower steel corrosion rate than Antifreeze K even though Antifreeze K contains a combination of Antifreezes I and J.

In addition to the foregoing the novel antifreezes of the invention have been found to be stable even after long periods of storage and do not significantly deteriorate rubber radiator hosing or "creep" therethrough.

We claim:

1. A method for producing an antifreeze composition consisting essentially of introducing into a water soluble freezing point depressant alcohol with agitation at at temperature between about 195 and 205° F., an alkali metal tetraborate, and alkaline earth metal oxide and boric acid, continuing said agitation until solutioning of substantially all ingredients occurs, reducing said temperature to between about 140 and 180° F. and then adding an alkali metal mercaptobenzothiazole and alkali metal hydroxide, cooling the resultant mixture to ambient temperature and adding an alkali metal arsenite together with an additional amount of said alcohol, wherein the proportions of said depressant, said alkali metal tetraborate, said alkaline earth oxide, said boric acid, said alkali metal arsenite, and said alkali metal mercaptobenzothiazole are adjusted to form said composition comprising between about 1 and 9 wt. percent of an inhibitor composition, said composition consisting essentially of between about 24 and 27 wt. percent alkali metal tetraborate, between about 36 and 45 wt. percent alkali metal metaborate, between about 4 and 5 wt. percent alkaline earth metal tetraborate, between about 6 and 10 wt. percent alkaline earth metal metaborate, between about 13 and 22 wt. percent alkali metal arsenite and between about 3 and 4 wt. percent alkali metal mercaptobenzothiazole.

2. A method of producing an antifreeze composition consisting essentially of introducing into a water soluble freezing point depressant alcohol with agitation at a temperature between about 195 and 205° F., an alkali metal tetraborate, an alkaline earth metal oxide, and boric acid, continuing said agitation until solutioning of substantially all ingredients occurs, reducing said temperature to between about 140 and 180° F. then adding an alkali metal mercaptobenzothiazole and an alkali metal hydroxide to said mixture with stirring, reducing the temperature of the mixture to ambient and subsequently adding an alkali metal arsenite together with an additional amount of said alcohol, followed by the addition of a petroleum lubricating oil solution of a $CO_2$ neutralized basic alkaline earth metal alkyl-benzene sulfonate of a molecular weight of between about 900 and 1500, wherein the proportion of ingredients are adjusted in a manner to form a composition consisting essentially of a water soluble freezing point depressant alcohol, between about 1 and 9 wt. percent of an inhibitor composition based on the weight of said depressant and between about 0.5 and 2.5 vol. percent of an oil phase inhibitor based on the volume of said depressant, said inhibitor composition consisting essentially of between about 24 and 27 wt. percent alkali metal tetraborate, between about 4 and 5 wt. percent alkaline earth metal tetraborate, between about 36 and 45 wt. percent alkali metal metaborate, between about 6 and 10 wt. percent alkaline metal metaborate, between about 13 and 22 wt. percent alkali metal arsenite and between about 3 and 4 wt. percent alkali metal mercaptobenzothiazole, and said oil phase inhibitor comprising between about 95 and 99.5 wt. percent of said lubricating oil and between about 0.5 and 5 wt. percent of said sulfonate.

References Cited by the Examiner

UNITED STATES PATENTS

| | | | |
|---|---|---|---|
| 2,681,891 | 6/1954 | Bos et al. | 252—75 |
| 2,803,603 | 8/1957 | Meighen | 252—75 |
| 2,815,328 | 12/1957 | Green et al. | 252—75 |
| 2,834,735 | 5/1958 | Woodle et al. | 252—74 |
| 2,886,531 | 5/1959 | Fiser | 252—75 |
| 2,937,146 | 5/1960 | Cutlip et al. | 252—75 |
| 2,960,473 | 11/1960 | Meighen et al | 252—75 |

JULIUS GREENWALD, *Primary Examiner.*